Jan. 31, 1961   O. P. LIEBREICH   2,969,670
GAUGE FOR MEASURING ACCURACY OF CURVATURE
Filed April 19, 1957

INVENTOR
Oscar P. Liebreich
By Edward H. Goodrich
HIS ATTORNEY

United States Patent Office 2,969,670
Patented Jan. 31, 1961

2,969,670

GAUGE FOR MEASURING ACCURACY OF CURVATURE

Oscar P. Liebreich, Waterbury, Conn., assignor to General Motors Corporation, Detroit, Mich., a corporation of Delaware Filed Apr. 19, 1957, Ser. No. 653,978

8 Claims. (Cl. 73—37.5)

This invention relates to gauging and particularly to a gauge for measuring the accuracy of curvature of an arcuate surface such as the transverse curvature of a raceway in a ball bearing.

High speed machine tools and other precision mechanisms employing members rapidly rotating about predetermined axes, require antifriction bearings such as ball bearings of extreme accuracy. Such a ball bearing must not only have balls of accurate sphericity, size and finish, but must also have annular raceways that receive these balls in a carefully predetermined fitted relation. These raceways in addition to having predetermined diameters within close tolerance limits, must also have transverse curvatures and surface finishes wherein the deviation from required dimensions should not exceed a few hundred-thousandths of an inch. Even a very slight inaccuracy of transverse curvature in one of these raceways, may be sufficient to materially affect the starting and running torque of such a bearing as well as to produce bearing stresses and strains which result in very short bearing life with consequent damage to the mechanism associated with the bearing. The diameter at the base of an annular raceway in a ball bearing may be measured with a suitable calipering micrometer. However, the arcuate transverse curvature of such a raceway has always been difficult to measure particularly with respect to the aggregate error which affects the fit of the balls against this raceway.

It is, therefore, an object of my invention to provide an improved and simply constructed gauge for quickly and easily measuring errors in curvature of an arcuate surface.

It is a further object of this invention to provide an improved gauge for checking the effective fitting relation of a ball in the raceway of a ball bearing.

It is a more specific object of my invention to provide an improved air gauge for quickly and easily measuring the accuracy of transverse curvature of a ball bearing raceway.

To these ends and also to improve generally upon devices of this character, this invention consists in the various matters hereinafter described and claimed. In its broader aspects, the invention is not necessarily limited to the specific arrangement selected for illustrative purposes in the accompanying drawings wherein Figure 1 is a fragmentary cross-sectional view of my gauging device in operative position and taken along the line 1—1 of Figure 2;

Figure 1:
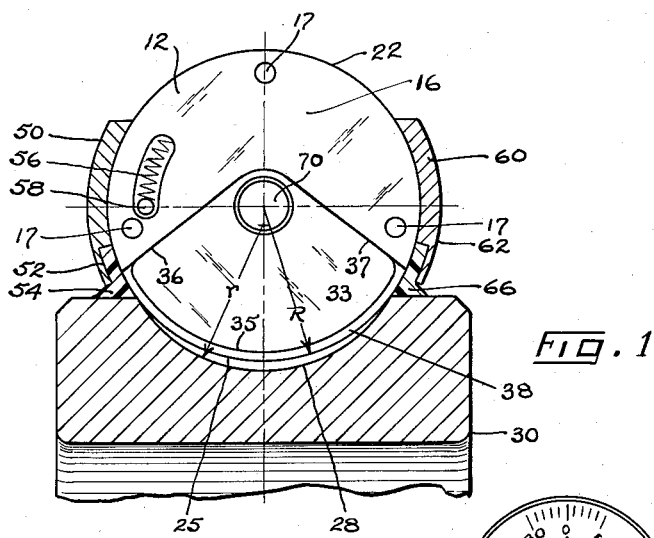
Figure 2:
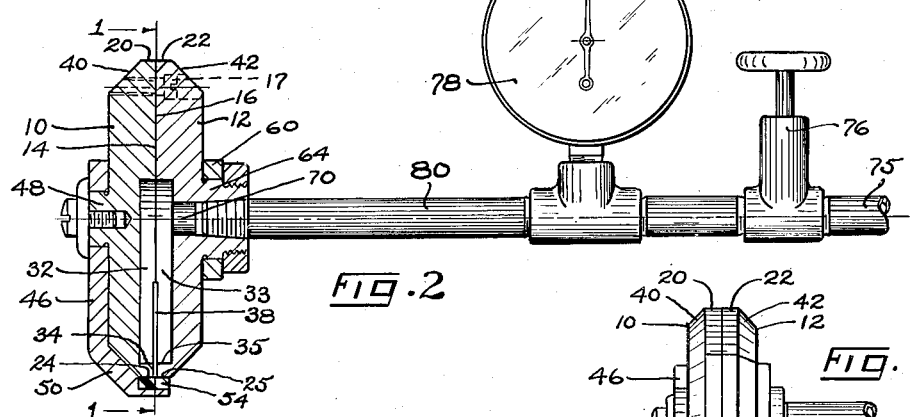
Figure 2 shows my gauging device with the gauging head in diametrical section.
Figures 3, 4:
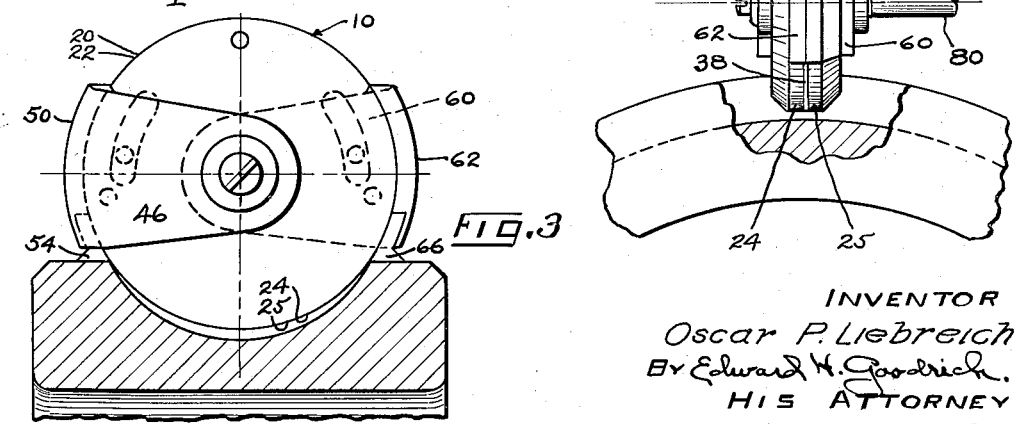
Figure 3 shows an end view of the gauging device applied in a raceway.
Figure 4 is a fragmentary side elevation.

A pair of generally circular gauge heads 10 and 12 are provided with inner flat faces 14 and 16 held in abutting sealing engagement as by screws 17. These heads 10 and 12 preferably have coextensive generally cylindrical peripheries 20 and 22, the lower portions of which form narrow coextensive arcuate portions 24 and 25 adapted to closely conform with or to seat against the arcuate surface whose curvature is to be accurately compared with a predetermined master curvature. In the present instance, my gauge is shown in position to measure the accuracy of transverse curvature of an arcuate raceway 28 in the race ring 30 of a ball bearing. The difference between curvature of the coextensive arcuate portions 24 and 25 and the transverse curvature of the raceway 28 is purposely greatly exaggerated in the drawings to better illustrate the operation of my gauge. In these drawings, the transverse curvature of the raceway 28 is shown as particularly having a radius $r$ and the arcuate measuring portions 24, 25 are illustrated as having a uniform master surface of curvature with a radius $R$ which matingly seats against the transverse raceway curvature when the raceway is of required size and shape. However, it will be appreciated that the arcuate gauging portions 24 and 25 on the gauge heads 10 and 12 may be of any suitable master curvature to conform with the required transverse curvature of the raceway 28 or other surface to be measured.

Each of the inner faces 14 and 16 is correspondingly cut away to provide cooperating sector-shaped recesses 32 and 33 terminating at their inner ends beyond the transverse diameter of the gauge head and terminating at their outer ends in generally coextensive arcuate surfaces 34 and 35 radially spaced from the arcuate master surfaces 24 and 25. These recesses terminate in angularly disposed walls 36 and 37 which are positioned beyond the outer ends of the raceways 28 or zone of measurement as best shown in Figure 1. The arcuate wall between the coextensive surfaces 34, 35 and the arcuate master surfaces 24, 25 is ground away from the abutting flat inner faces 14 and 16 to provide a narrow arcuate slot 38 between the heads 10 and 12 and substantially normal to the axis of curvature of the master surfaces 24, 25 and extending between the angularly disposed walls 36 and 37. This arcuate slot 38 is shown exaggerated in width for clarity of illustration but may be as narrow as only a few thousandths of an inch depending upon the area and curvature of the surface to be measured. This slot 38 is carefully ground to a uniform width so that its juncture with the arcuate master surfaces 24 and 25 will provide a pair of evenly spaced curved edges free of burrs and other conditions of non-uniformity. The gauge heads 10 and 12 are also preferably provided with similar frusto-conical faces 40 and 42 which terminate at the relatively narrow coextensive master surfaces 24 and 25.

A baffle arm 46 is journalled at its inner end for free pivotal movement on an axially extending hub 48 on the gauge head 10 and held in position by a suitable screw and washer. This baffle arm closely fits against the side of the gauge head and has a laterally extending arcuate flange 50 fitting against the frusto-conical face 40 and closely overlying both peripheral faces 20 and 22. The lower end of the flange 50 is recessed at 52 and has secured therein a resiliently deformable rubber-like seal 54. A spring 56 compressed within a recess of the gauge head 10, engages a projecting pin 58 on the baffle 46 to urge the baffle counterclockwise causing the seal 54 to deform into sealing relation between the arcuate portions 24, 25 and the end of the arcuate zone being measured. A similar baffle 60 having a flanged portion 62 corresponding to the flanged portion 50, is journalled on a hub 64 of the gauge head 12 and spring urged clockwise to locate a resiliently deformable rubber-like seal 66 in sealing relation between the arcuate portion 24, 25 and the other end of the arcuate zone being measured. A port 70 through the hub 64 is adapted to receive fluid under pressure and communicates with the sector-shaped recesses 32 and 33. Fluid under pressure, such as air from a suitable source, is fed through piping 75 and a pressure control valve 76 to a communicating pressure gauge 78 and thence through piping 80 into the port 70.

In operation, the gauging head and work are located in relation to each other to interefit the arcuate master surfaces 24 and 25 as closely as possible against the transverse curvature of the raceway 28 or other arcuate surface being gauged. At this time, the spring urged baffles 46 and 60 will pivotally locate and sealingly position the yieldable rubber-like seals 54 and 66 between the gauge head and the ends of the surface being measured thus preventing fluid leakage from the ends of the slot 38 beyond the arcuate surface being gauged. Fluid such as air under a predetermined pressure controlled by the valve 76, is delivered to the gauge 78 and through the piping 80 into the sector-shaped recesses 32 and 33 and permitted to leak out radially through the narrow slot 38 against the raceway or other arcuate surface being measured. The accuracy of interfit of the surfaces 24 and 25 at the arcuate edges of the slot 38 against the surface being measured, determines the leakage of fluid from the slot 38 which in turn registers on the gauge 78 to indicate the extent of curvature inaccuracy in the surface being measured. If the raceway 28 is of precisely correct curvature, the arcuate surfaces 24, 25 will fit thereagainst and the portion of the surface being gauged will seal the outer end of the slot 28 causing a full line pressure reading on the gauge 78 and indicating an accurately shaped work surface. If there is nonconforming seating relation of the master surfaces 24, 25 against the surface being gauged, there will be a corresponding air leakage out of the slot 38 circumferentially of the raceway 28, the extent of which leakage will show as a drop in pressure recorded by the gauge 78 thus indicating the extent of work surface inaccuracy. Hence, it will be appreciated that my invention provides an efficient and accurate gauge for quickly determining inaccuracies of a curved surface and particularly of a transversely curved surface such as the raceway of a ball bearing. Although this invention illustrates gauging the transverse curvature of the inner or cone raceway of a ball bearing, it will be apparent that my invention may be also used in a comparable manner to gauge an internally curved surface such as the outer raceway of a ball bearing, it being only necessary that the pipe 80 be bent at an angle to lie out of interfering relation with the work piece being gauged.

I claim:

1. In a gauge for measuring the accuracy of transverse curvature of an arcuate surface, a gauging head having a narrow parti-cylindrical measuring portion for conformingly fitting against the required transverse curvature of an arcuate surface to be measured, the gauge head having an arcuate slot longitudinally extending beyond the extent of said transverse curvature of the arcuate surface and located substantially normal to the axis of the curvature of said parti-cylindrical measuring portion, said slot radially opening through said parti-cylindrical portion and onto the entire transverse extent of a portion of said arcuate surface during a gauging operation, means supplying fluid under predetermined pressure into a portion of the slot within said head, and a gauge responsive to reduction in fluid pressure within said slot under control of the leakage of fluid from the edges of said slot against the entire length of transverse curvature of that portion of the surface being measured when said parti-cylindrical gauge head portion is positioned in general conforming relation against said surface.

2. In a gauge for determining curvature errors in an arcuate surface of a work piece, a gauge head having an arcuate measuring portion precisely shaped to the required curvature of a part of the surface to be measured, the gauge head having therein an arcuate slot which radially opens through said measuring portion and onto the arcuate work piece surface during a gauging operation, the arcuate length of said slot extending outwardly beyond the extent of curved surface being measured, means supplying fluid under pressure into said slot within the gauge head, resilient sealing means preventing fluid leakage from the slot beyond the extent of the surface being measured, and a gauge responsive to reduction in fluid pressure depending upon fluid leakage from said slot and between the gauge head measuring portion and the arcuate surface being measured.

3. In a gauge for determining the accuracy of curvature of an arcuate surface on a work piece, a gauge head containing a cavity, an arcuate measuring portion on said head conforming in curvature to the desired contour of a portion of the arcuate surface to be gauged, said head having a narrow arcuate slot opening into the cavity and radially opening through said arcuate measuring portion onto the work piece surface being gauged, the arcuate length of said slot extending beyond the extent of curvature of that portion of the surface being gauged, a pair of baffle members movably mounted on the head and closing the ends of the slot beyond the extent of the arcuate surface being gauged, means supplying fluid under predetermined pressure into said cavity, and a gauge indicating errors in work surface contour caused by a drop in fluid pressure, in said cavity dependent upon the leakage of the fluid under pressure between the edges of said slot and the work surface being measured.

4. In a gauge for determining errors in curvature of an arcuate work piece surface, a gauge head having an external arcuate portion shaped to matingly conform to the desired curvature of a portion of the work piece surface to be measured, said gauge head having recessed chamber, means supplying air under predetermined pressure into said chamber, said head having an arcuate slot disposed normally to the axis of curvature of said arcuate measuring portion, said slot opening internally into the chamber and radially opening externally through said arcuate measuring portion onto the work piece surface being gauged, the arcuate length of said slot extending outwardly beyond the extremities of that portion of the surface being gauged, a pair of baffle members pivotally mounted on the head and resiliently urged into closing relation across the ends of the slot beyond the surface being measured, and a gauge indicating errors in work surface curvature in response to reduction in fluid pressure dependent upon the leakage of fluid under pressure between the outer edges of said slot and the arcuate surface being measured.

5. In a gauge for determining the accuracy of curvature of an arcuate surface on a work piece, a gauge head having a recessed chamber, an arcuate external measuring portion on said head conforming in curvature to the desired contour to a portion of the arcuate surface to be gauged, said measuring portion being adapted to be seated closely against the arcuate work surface during a measuring operation, the head having a narrow arcuate slot disposed normally to the axis of the arcuate measuring portion, said slot communicating internally with said chamber and radially opening externally through the arcuate measuring portion and having uniformly spaced edges in the surface of said measuring portion, the arcuate extent of said slot extending longitudinally outwardly beyond the extremities of that portion of the surface being measured, mechanism sealingly closing the ends of the slot beyond the surface being measured, means supplying air under predetermined pressure into said chamber, and a gauge responsive to changes in pressure within the chamber dependent upon the leakage of air between the edges of the slot and the surface being measured while the arcuate measured portion is seated closely against the arcuate work piece surface.

6. In a gauge for determining the accuracy of curvature of an arcuate surface on a work piece, a gauge head having a generally circular periphery, a hub at each end of said head, a portion of said periphery including an arcuate master surface contoured to matingly conform to the desired contour of a portion of the arcuate work piece surface, said head having a recessed chamber therein, means applying air under predetermined pressure through one of said hubs and into the chamber, said head having a narrow arcuate slot communicating with said chamber and radially opening through the measuring surface onto the arcuate surface of the work piece during a gauging operation, said slot terminating at its open outer end in a pair of uniformly spaced edges of uniform contour, said slot longitudinally extending outwardly beyond the ends of the curved portion of the surface being measured, a pair of baffles respectively journalled on said hubs, said baffles closing the ends of the slot against air leakage beyond the zone of the arcuate surface being gauged, and a gauge indicating inaccuracies in work surface contour due to leakage of air between the edges of said slot and the work surface being gauged.

7. In a gauge for determining the accuracy of curvature of an arcuate surface on a work piece, a gauge head having a generally circular periphery, a hub at each end of said head, a portion of said periphery including an arcuate master surface contoured to matingly fit the required curvature of the arcuate work piece surface, said head having a recessed chamber therein, means supplying air under pressure through one of said hubs and into the chamber, said head having a narrow arcuate slot communicating with said chamber and radially opening through said master surface, said slot having a pair of uniformly spaced and uniformly contoured outer edges within the arcuate master surface, said slot longitudinally extending outwardly beyond the ends of the curved portion of the surface being measured, a pair of baffles respectively journalled on said hubs, an arcuate flange on each baffle overlying a portion of the gauge head periphery, a resilient deformable sealing member carried by an end of each flange, means resiliently urging the baffles and sealing members into closing engagement against the work piece and over the ends of said slot beyond the zone of the arcuate surface being measured and a gauge measuring the pressure within said chamber under control of the leakage of air from said slot in accordance with the accuracy of curvature of the arcuate work piece surface being measured.

8. In a gauge for measuring the accuracy of transverse curvature of a bearing raceway, a gauging member provided with an arcuate measuring portion of predetermined contour for fitting into closely conforming engagement, with a transverse curvature of the raceway to be measured, said measuring portion extending through an arcuate distance exceeding the length of transverse curvature of said raceway, said gauging member containing a narrow arcuate slot disposed in a plane transversely of the axis of said arcuate portion, the slot extending through said arcuate portion and opening onto said raceway transversely of the raceway during its measurement, the arcuate length of said slot exceeding the length of transverse curvature of said raceway, means delivering fluid under predetermined pressure into said slot, and mechanism responsive to change in said fluid pressure dependent upon fluid leakage from said slot under control of the extent of conforming contour of the arcuate edges of said slot against the arcuate surface being measured.

References Cited in the file of this patent
UNITED STATES PATENTS

| | | |
|---|---|---|
| 2,471,737 | Fox | May 31, 1949 |
| 2,479,606 | Douglass | Aug. 23, 1949 |
| 2,687,038 | Aller | Aug. 24, 1954 |
| 2,771,687 | Hutto | Nov. 27, 1956 |
| 2,781,661 | Van Dorn | Feb. 19, 1957 |